UNITED STATES PATENT OFFICE.

RUFUS W. LAMPREY, OF MANCHESTER, NEW HAMPSHIRE.

FIREPROOF PAINT.

SPECIFICATION forming part of Letters Patent No. 483,307, dated September 27, 1892.

Application filed November 2, 1891. Serial No. 410,621. (No specimens.)

*To all whom it may concern:*

Be it known that I, RUFUS W. LAMPREY, of Manchester, in the county of Hillsborough and State of New Hampshire, have invented certain new and useful Improvements in Fireproof Paint, of which the following is a specification.

This invention has for its object to provide a paint adapted to be spread smoothly by a brush and constituting when applied to a wooden or other surface a coating which while possessing the desirable characteristics of the paints now in general use will possess the further and very important characteristic of being indestructible by fire. These results I attain by the composition of ingredients which I will now proceed to describe.

In making my improved paint I take as a base slate and mica ground to a fine powder. To these I add lead carbonate. To these I add a suitable gum—such as gum-arabic, shellac, or gum-tragacanth—cut or dissolved with an alkaline solution of, preferably, carbonate of soda and a suitable quantity of oil, preferably linseed oil. To the above ingredients are added a suitable quantity of water, and the whole is boiled a suitable length of time. The product is a paint which may be given any desired tint by the use of coloring-matters or pigments such as are generally employed for this purpose. This improved paint, while being adapted to spread smoothly and form a coating on wooden surfaces, which will not scale and crack, is indestructible by fire, as I have demonstrated by severe and repeated tests.

While the above composition of matter constitutes an operative paint, I prefer to add other ingredients—namely, ground plaster-of-paris or whiting and sulphate of ammonia or other soluble salt of ammonia. For many purposes the paint is considerably improved by the addition of the last-named ingredients.

While I do not confine myself to any specific proportions of the ingredients mentioned, I specify the following proportions as giving satisfactory results: ground slate, eight pounds; ground mica, four pounds; gum-tragacanth, one-half pound; shellac, one pound; gum-arabic, one-fourth pound; lead carbonate, two pounds; ground calcium sulphate, one-fourth pound. The above-named ingredients are boiled in two gallons of water, and during the boiling operation I add three ounces of carbonate of soda. After the boiling has been completed I add three ounces of sulphate of ammonia, and in some cases I also prefer to add an equal quantity of chloride of ammonia—namely, three ounces. To the whole I add one pint of linseed-oil and any suitable coloring-matter, preferably dry colors, ground in. This makes a very durable fireproof paint, which is free from liability to scale off or crack.

While I have mentioned the conjoint use of three gums, I desire it understood that I may use any one of the three alone or any other suitable gum or mixture of gums. The ground slate and mica form the solid body of the paint, and the ammonia salt penetrates the wood and assists the paint to adhere firmly to the wood. The gums impart to the paint an adhering quality, and the linseed-oil and lead impart durability and increase the fireproof quality of the paint.

I claim—

1. A fireproof paint comprising the following ingredients, namely: ground slate, ground mica, a suitable gum or gums, an alkali, such as soda carbonate, oil, lead carbonate, and a salt of ammonia, substantially as described.

2. The improved fireproof paint consisting of ground slate, ground mica, lead carbonate, ground calcium sulphate, a suitable gum or gums, a salt of an alkali, such as soda carbonate, a soluble salt of ammonia, and an oil, the slate, mica, calcium, and gum being boiled in water, substantially as described.

In testimony whereof I have signed my name to this specification, in the presence of two subscribing witnesses, this 27th day of October, A. D. 1891.

RUFUS W. LAMPREY.

Witnesses:
 JOHN FOSTER,
 FRANK C. TWOMBLY.